US011270123B2

(12) United States Patent
Sureshkumar et al.

(10) Patent No.: US 11,270,123 B2
(45) Date of Patent: Mar. 8, 2022

(54) SYSTEM AND METHOD FOR GENERATING LOCALIZED CONTEXTUAL VIDEO ANNOTATION

(71) Applicant: Palo Alto Research Center Incorporated, Palo Alto, CA (US)

(72) Inventors: Karunakaran Sureshkumar, Los Angeles, CA (US); Raja Bala, Pittsford, NY (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/026,897

(22) Filed: Sep. 21, 2020

(65) Prior Publication Data
US 2021/0117685 A1    Apr. 22, 2021

Related U.S. Application Data

(60) Provisional application No. 62/924,586, filed on Oct. 22, 2019.

(51) Int. Cl.
| | |
|---|---|
| *H04N 7/10* | (2006.01) |
| *G06K 9/00* | (2022.01) |
| *G06K 9/62* | (2022.01) |
| *G10L 15/04* | (2013.01) |
| *G10L 15/18* | (2013.01) |
| *G10L 15/22* | (2006.01) |
| *G10L 21/0272* | (2013.01) |
| *G10L 25/63* | (2013.01) |
| *H04N 21/439* | (2011.01) |

(Continued)

(52) U.S. Cl.
CPC ..... *G06K 9/00718* (2013.01); *G06K 9/00765* (2013.01); *G06K 9/629* (2013.01); *G06K 9/6293* (2013.01); *G10L 15/04* (2013.01); *G10L 15/1815* (2013.01); *G10L 15/22* (2013.01); *G10L 21/0272* (2013.01); *G10L 25/63* (2013.01); *H04N 21/4394* (2013.01); *H04N 21/4398* (2013.01); *H04N 21/44008* (2013.01); *H04N 21/44016* (2013.01); *H04N 21/812* (2013.01)

(58) Field of Classification Search
CPC .......... H04N 21/4394; H04N 21/4398; H04N 21/44008; H04N 21/44016; H04N 21/812; H04N 21/251; H04N 21/233; H04N 21/23418; H04N 21/26603; H04N 21/8456
See application file for complete search history.

(56) References Cited

U.S. PATENT DOCUMENTS 4,570,232 A * 2/1986 Shikano .................. G10L 15/12
704/241
5,598,557 A * 1/1997 Doner ................. G06F 16/3346
(Continued)

*Primary Examiner* — Michael B. Pierorazio
(74) *Attorney, Agent, or Firm* — Shun Yao; Yao Legal Services, Inc.

(57) ABSTRACT

Embodiments described herein provide a system for localized contextual video annotation. During operation, the system can segment a video into a plurality of segments based on a segmentation unit and parse a respective segment for generating multiple input modalities for the segment. A respective input modality can indicate a form of content in the segment. The system can then classify the segment into a set of semantic classes based on the input modalities and determine an annotation for the segment based on the set of semantic classes.

26 Claims, 13 Drawing Sheets

(51) Int. Cl.
*H04N 21/44* (2011.01)
*H04N 21/81* (2011.01)

(56) References Cited

U.S. PATENT DOCUMENTS

| | | | | |
|---|---|---|---|---|
| 6,085,160 A * | 7/2000 | D'hoore | G09B 19/06 | 704/2 |
| 6,098,082 A * | 8/2000 | Gibbon | G06F 16/748 | 715/202 |
| 6,112,186 A * | 8/2000 | Bergh | G06Q 30/02 | 705/7.32 |
| 6,442,518 B1 * | 8/2002 | Van Thong | G10L 15/26 | 704/235 |
| 6,473,778 B1 * | 10/2002 | Gibbon | G06F 40/103 | 715/201 |
| 7,035,468 B2 * | 4/2006 | Yogeshwar | G06F 16/68 | 382/232 |
| 7,047,191 B2 * | 5/2006 | Lange | G10L 15/005 | 348/468 |
| 7,065,524 B1 * | 6/2006 | Lee | G06Q 30/02 | |
| 7,092,888 B1 * | 8/2006 | McCarthy | G10L 15/063 | 379/88.01 |
| 7,110,664 B2 * | 9/2006 | Yogeshwar | H04N 5/76 | 386/328 |
| 7,509,385 B1 * | 3/2009 | Rittmeyer | G06Q 10/107 | 709/206 |
| 7,729,917 B2 * | 6/2010 | Miyamoto | G10L 15/22 | 704/270 |
| 7,739,253 B1 * | 6/2010 | Yanovsky | G06F 16/9535 | 707/705 |
| 7,801,910 B2 * | 9/2010 | Houh | G06F 16/745 | 707/765 |
| 7,908,628 B2 * | 3/2011 | Swart | H04N 21/2662 | 725/93 |
| 7,962,331 B2 * | 6/2011 | Miller | G10L 15/01 | 704/215 |
| 8,121,432 B2 * | 2/2012 | Dorai | G06F 16/7834 | 382/276 |
| 8,131,545 B1 * | 3/2012 | Moreno | G10L 15/04 | 704/235 |
| 8,209,724 B2 * | 6/2012 | Rathod | H04N 21/435 | 725/53 |
| 8,248,528 B2 * | 8/2012 | Hosking | H04N 7/165 | 348/468 |
| 8,423,363 B2 * | 4/2013 | Gupta | G10L 15/22 | 704/255 |
| 8,572,488 B2 * | 10/2013 | Phillips | G06F 16/4393 | 715/716 |
| 2002/0055950 A1 * | 5/2002 | Witteman | G06F 16/40 | 715/203 |
| 2002/0093591 A1 * | 7/2002 | Gong | G06F 16/7834 | 348/515 |
| 2003/0025832 A1 * | 2/2003 | Swart | H04N 21/2343 | 348/461 |
| 2003/0061028 A1 * | 3/2003 | Dey | G06F 16/40 | 704/9 |
| 2003/0169366 A1 * | 9/2003 | Lenzi | H04N 7/10 | 348/461 |
| 2003/0206717 A1 * | 11/2003 | Yogeshwar | G06F 16/71 | 386/328 |
| 2004/0096110 A1 * | 5/2004 | Yogeshwar | G06F 16/51 | 382/239 |
| 2005/0227614 A1 * | 10/2005 | Hosking | H04N 7/165 | 455/3.06 |
| 2006/0015339 A1 * | 1/2006 | Charlesworth | G10L 15/187 | 704/251 |
| 2007/0124147 A1 * | 5/2007 | Gopinath | G10L 15/19 | 704/257 |
| 2007/0124788 A1 * | 5/2007 | Wittkoter | H04N 21/8133 | 725/112 |
| 2008/0066138 A1 * | 3/2008 | Bishop | H04N 21/4884 | 725/137 |
| 2008/0262996 A1 * | 10/2008 | Yogeshwar | G06F 16/71 | |
| 2008/0266449 A1 * | 10/2008 | Rathod | H04N 21/4828 | 348/468 |
| 2009/0171662 A1 * | 7/2009 | Huang | G10L 15/1822 | 704/251 |
| 2011/0040559 A1 * | 2/2011 | Kim | G10L 21/055 | 704/231 |
| 2013/0254795 A1 * | 9/2013 | Botta | G11B 27/322 | 725/28 |
| 2014/0165095 A1 * | 6/2014 | Miller | H04N 21/44016 | 725/34 |
| 2016/0007054 A1 * | 1/2016 | Polumbus | G06F 16/683 | 725/116 |
| 2016/0323643 A1 * | 11/2016 | Panchaksharaiah | H04N 21/4753 | |
| 2017/0150227 A1 * | 5/2017 | Kim | H04N 21/47815 | |

* cited by examiner

SYSTEM AND METHOD FOR GENERATING LOCALIZED CONTEXTUAL VIDEO ANNOTATION

RELATED APPLICATION

This application claims the benefit of U.S. Provisional Application No. 62/924,586, titled "Personalized Viewing Experience and Contextual Advertising in Streaming Media based on Scene Level Annotation of Videos," by inventors Suresh Kumar and Raja Bala, filed 22 Oct. 2019, the disclosure of which is incorporated by reference herein.

BACKGROUND

Field

This disclosure is generally related to the field of artificial intelligence (AI). More specifically, this disclosure is related to a system and method for obtaining localized contextual information from a video and utilizing the localized contextual information for annotating individual segments of the video.

Related Art

The exponential growth of video content distribution services (e.g., YouTube) and stream services (e.g., Amazon Prime or Netflix) have brought easy access to a variety of videos (e.g., a video file or a stream). Viewers can be generally interested in metadata associated with a video, such as rating and suitability for a particular age group. If the video file is a movie or a television show, viewers may also be interested in genre, rating, protagonists, trailers, and reviews. However, such information may indicate a global view of the video and does provide temporal information or guidance as the video progresses from scene to scene.

Furthermore, the video may be provided to the viewers in an advertisement-supported form. However, the advertisements inserted into the video may not have any context to the preceding segment of the video (i.e., the segment that has been playing prior to the advertisement). Since the video segment may impact the emotional state of a viewer, the content of the advertisement may not be suitable for the emotional state of a viewer without considering contextual information associated with the video segment. Consequently, the placement of the advertisement may become counter-productive While global metadata bring many desirable features to a video content provider, some issues remain unsolved in facilitating localized contextual annotation of a video for efficient viewing and monetization.

SUMMARY

Embodiments described herein provide a system for localized contextual video annotation. During operation, the system can segment a video into a plurality of segments based on a segmentation unit and parse a respective segment for generating multiple input modalities for the segment. A respective input modality can indicate a form of content in the segment. The system can then classify the segment into a set of semantic classes based on the input modalities and determine an annotation for the segment based on the set of semantic classes. The annotation can indicate semantic contextual information of the segment.

In a variation on this embodiment, the system can apply a corresponding classifier on a respective input modality for determining classification for the input modality. Subsequently, the system can determine a unified classification for the segment based on the classifications for the multiple input modalities. The system can then determine annotation for the segment based on the unified classification.

In a further variation, the system can determine the unified classification by fusing the classifications for the multiple input modalities with each other to generate the unified classification.

In a variation on this embodiment, the multiple input modalities include video frames separated from the audio signal of the segment. The system can then classify the segment by applying a deep visual classifier on the video frames to generate visual classification for the segment.

In a variation on this embodiment, the multiple input modalities include an audio signal separated from the video frames of the segment. The system can then classify the segment by decomposing the audio signal into a background signal and a speech signal. The system can then apply an audio classifier on the background signal to generate background audio classification for the segment. The system can also apply an emotion classifier on the speech signal to generate emotion classification for the segment.

In a variation on this embodiment, the multiple input modalities include textual information separated from audio-visual signals of the segment. The system can then classify the segment by obtaining speech text representing verbal speeches in the segment. The system can then align the textual information with the speech text and apply a text-based classifier on the aligned text to generate textual classification for the segment.

In a further variation, the system can obtain a script of the movie and further aligning the script with the speech text.

In a variation on this embodiment, the system can classifying the segment by obtaining respective feature embeddings from the classifications for the multiple input modalities and combining the feature embeddings to generate a unified embedding. The system can then apply a semantic classifier on the unified embedding to determine the unified classification.

In a further variation, the system can combine the feature embeddings by applying feature concatenation on the feature embeddings.

In a variation on this embodiment, the annotation can include a set of keys indicating the semantic contextual information of the segment. A respective key can include a value and a strength. The value can indicate a feature of the segment, and the strength can indicate the likelihood of the value being associated with the segment.

In a variation on this embodiment, the segmentation unit can be one or more of: an act, a scene, a beat, and a shot of the video.

In a variation on this embodiment, a respective semantic class can correspond to one of: action, danger, romance, friendship, and outdoor adventure.

Embodiments described herein provide a system for placing advertisement based on localized contextual video annotation. During operation, the system can segment a video into a plurality of segments based on a segmentation unit and parse a respective segment for generating multiple input modalities for the segment. A respective input modality can indicate a form of content in the segment. The system can then classify the segment into a set of semantic classes based on the input modalities and determine an annotation for the segment based on the set of semantic classes. Subsequently, the system can identify an inter-segment availability (ISA) between segments of the video file as a target location for placing an advertisement and send the annotations of a set of segments associated with the ISA to an advertisement system. The set of segments includes one or more of: a preceding segment of the ISA and a subsequent segment of the ISA.

Embodiments described herein provide a system for facilitating discretionary viewing based on localized contextual video annotation. During operation, the system can segment a video into a plurality of segments based on a segmentation unit and parse a respective segment for generating multiple input modalities for the segment. A respective input modality can indicate a form of content in the segment. The system can then classify the segment into a set of semantic classes based on the input modalities and determine an annotation for the segment based on the set of semantic classes. Subsequently, the system can obtain a viewing preference from a viewer of the video and determine a set of viewing segments from the plurality of segments based on the annotations for the plurality of segments. The set of viewing segments complies with the viewing preference.

BRIEF DESCRIPTION OF THE FIGURES

In the figures, like reference numerals refer to the same figure elements.

DETAILED DESCRIPTION

Figure 1A:
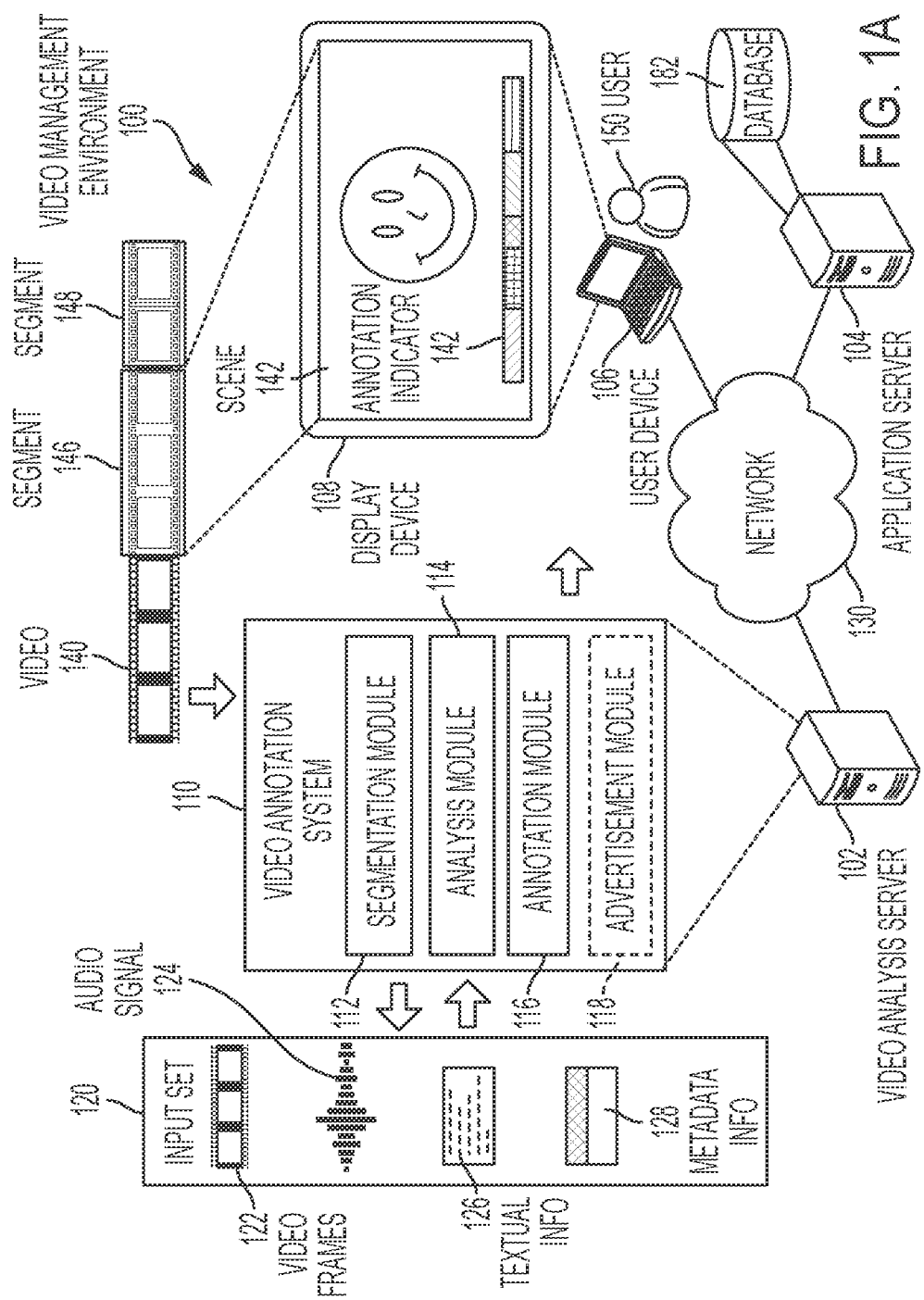
FIG. 1A illustrates an exemplary video annotation system facilitating localized contextual annotation in a video, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of generating localized contextual information from a respective video segment of a video by (i) dividing a video into meaningful segments and obtaining multiple input modalities indicating the content of a respective video segment; (ii) determining multimodal contextual information by applying a corresponding form of artificial intelligence (AI) model on a respective mode of input, and (iii) unifying the multimodal contextual information to obtain unified contextual information.

With existing technologies, some video providing services often use scene-level content detection for video search and retrieval, summarization, alignment of subtitles, and actor identification. However, the detected content may not represent contextual information for the scene, such as whether that specific scene is suitable for viewing in front of children or a type of emotion depicted in the scene. As a result, even though a viewer may be aware of the presence of certain types of scenes (e.g., an R-rated activity or an intense fight scene) in the video, the viewer may not be aware of the location of the scene prior to watching the video. Furthermore, some video providers may insert advertisements into certain locations of the video. However, the content of the video that has been playing prior to an advertisement may put a viewer in an emotional state that may not be compatible or suitable for the advertisement.

To solve this problem, a video annotation system can use one or more scene segmentation techniques to identify individual segments of a video. The system can determine the starting and ending timestamps of each segment. The segmentation techniques can be based on one or more of: object detection, set theory, and deep neural network. A segment of a video (or a video segment) can be based on an act, a scene, a beat, or a shot of the video. The system can then obtain contextual semantic information associated with a respective segment. Subsequently, the system can classify the segment and annotate the segment based on the classification. For example, the system can determine with one or more categories associated with the segment. Accordingly, the system can annotate the segment with a respective determined category and a likelihood of the segment being in that category. The annotation can then be used to personalize the movie toward a particular audience (e.g., inappropriate video segments can be skipped over in the presence of minors).

In some embodiments, the system can determine multiple input modalities, which can also be referred to as multimodal inputs associated with the video. Such input modalities can include, but are not limited to, the video channel, the audio signal of the video (e.g., the background and speech), textual information (e.g., the script and subtitles) of the video, and additional metadata of the video (e.g., known metadata and additional information embedded in the video). The system can apply a corresponding form of AI model on each mode of input and determine the corresponding classification into a semantic category. For example, the system can apply a deep visual classifier on the video channel to identify (or infer) the semantic category of the video segment. Similarly, the system can apply natural language processing (NLP) on the script of the segment to infer the semantic category as well. In this way, the system can obtain a multimodal classification for the segment (i.e., from multiple modes of classification) and determine unified classification by applying joint inference on the classifications from multimodal inputs.

The system can then determine the annotation for a respective segment and incorporate the annotation with the video. The annotation can be in the form of a set of keys. Each key can indicate an object, a genre, a concept, or an action associated with a segment. The key can also indicate a rating, the name of a character, and a location. Each key can be represented by a value and a strength. Hence, the key can be in the form of {key: (value, strength)}. The value of a key can depend on the type of key. For example, if a key is the category (or genre) of a segment, the value can be one of: action, adventure, comedy, crime, drama, fantasy, horror, musical, mystery, romance, and sci-fi. The strength can be a number (e.g., between 0 and 1) that indicates the likelihood of the presence of the given value (e.g., a strength level or confidence level).

If the keys represent a semantic category, the system can generate a normalized representation of the semantic categories (i.e., the values) associated with the key. Furthermore, the system can present a normalized representation of the strengths of the values associated with each key. The normalization can be based on a value of 1 (or 100). The likelihood of the segment being in a specific category is represented with a fraction value between 0 and 1, and summation of the fraction values of all categories can be 1. The fraction value associated with a specific category can be referred to as an annotation value. In some embodiments, each of the annotation values associated with a segment can be expressed with a distinct representation (e.g., with a color, fill-pattern, or value) to generate an annotation indicator. Subsequently, the system can provide the annotation indicator to a video provider, which can then display the annotation indicator with the corresponding video segment.

The annotation can facilitate a personalized viewing option for a viewer. The viewer may choose to automatically skip through items in the video that belong to a specific category. If the strength of a value indicating the category is greater than a threshold, the system may determine that the segment belongs to the category. Hence, each segment may belong to multiple categories. The viewer may also select to watch certain parts of the video that matches specific characteristics. For example, the viewer can choose to watch only the segments that have a certain actor or has specific actions. The system may allow the viewer to select the set of values of a specific key (e.g., a set of categories) for the annotation. The system can then skip over or only show the segments that correspond to the categories. The system can maintain the starting and ending timestamps of a respective segment. Consequently, whenever the timestamp of a selected segment is determined, the system can skip over or show the segment between the starting and ending timestamps.

Furthermore, the annotations can be used for placing contextually relevant advertisements in a video. The system may identify the inter-segment availabilities (ISAs) (i.e., available spots between segments) in the video as advertisement spots. Since the ISAs can be between scenes, the ISA-based placement of an advertisement may not interrupt an important sequence or scene in the video. Consequently, the placement of the advertisements may cause less irritation to the viewer. An administrator of the video providing application may configure a number of times the video can be stopped to show one or more advertisements. Based on the number, the system may recommend a set of ISAs for placing the advertisements using one or more policies. For example, the policies can include avoiding or using cliffhangers, avoiding scene fragmentations, and feel-good preceding segments.

When an advertisement spot is approaching, the system can provide the annotations to an advertisement system (e.g., an advertisement exchange and/or platform). The annotations can be associated with the preceding and subsequent scene of the advertisement spot (i.e., the ISA), the last beat in the preceding scene, and the first beat in the subsequent scene. The advertisement system can dynamically match the annotations with the content of the available advertisements and place the advertisement that matches the contextual information represented in the annotations. Alternatively, an advertisement's owner (e.g., insurance companies) can buy tags (e.g., fire, explosions, etc.) relevant to the business. If the annotation matches a particular tag, the advertisement can be placed in the corresponding spot. The match can be based on the values and corresponding strengths in the keys. In this way, the annotation can facilitate the placement of contextually relevant advertisements in the video.

Exemplary System

FIG. 1A illustrates an exemplary video annotation system facilitating localized contextual annotation in a video, in accordance with an embodiment of the present application. A video management environment 100 includes an application server 104, which can host one or more applications that can host video content and may provide a video 140 to a user 150. For example, the application can provide a video streaming or television-based content delivery service to provide video 140 user device 106 of user 150. Such applications include, but are not limited to, a video content distribution service, a video streaming service, a television service, and a virtual/augmented reality service provider. Applicant server 104 can be in communication with an advertisement provider that can incorporate advertisements into video 140. Applicant server 104 can maintain a database 182 for storing video content, such as video 140, and/or advertisement content for video 140. Applicant server 104 can be reachable (e.g., from device 106) via a network 130, which can be a local or a wide area network.

With existing technologies, the application on application server 104 may use scene-level content detection on a scene 142 of video 140. Using the scene-level content detection, the application may facilitate video search and retrieval from a display device 108 of user device 106. Furthermore, the application can also provide summarization, alignment of subtitles, and actor identification associated with scene 142 to device 106. However, the detected content of scene 142 may not represent contextual information for scene 142, such as whether scene 142 is suitable for viewing in front of children or the type of emotion depicted in scene 142.

As a result, even though user 140 may be aware of the presence of a certain type of content (e.g., an R-rated activity or an intense fight scene) that may appear in video 140, user 150 may not be aware of the presence of such content in a specific scene, such as scene 142. Furthermore, the application may insert an advertisement into video 140 after scene 142. However, the content of scene 142, which has been playing prior to displaying the advertisement, may put user 150 in an emotional state that may not be compatible or suitable for the advertisement.

To solve this problem, environment 100 can include a video annotation system 110 that can determine segment-level contextual information and use the information to annotate a respective segment of video 140. System 110 can be equipped with a segmentation module 112, an analysis module 114, and an annotation module 116. System 110 may optionally include an advertisement module 118 (denoted with dotted lines). Segmentation module 112 can support and implement one or more scene segmentation techniques that can identify individual segments, such as segments 146 and 148, of video 140. If the segments are determined at the scene level, segment 146 can be the same as scene 142.

During operation, segmentation module 112 can determine the starting and ending timestamps of each segment of video 140. The segmentation techniques can be based on one or more of: object detection, set theory, and deep neural network. A segment of video 140, which can be referred to as a video segment, can be an act, a scene, a beat, or a shot of video 140. Analysis module 114 can then obtain contextual semantic information associated with segment 146. Subsequently, analysis module 114 can classify segment 146 and annotate segment 146 based on the classification. Here, analysis module 114 can determine one or more categories associated with segment 146.

In some embodiments, analysis module 114 can determine multiple input modalities associated with video 140. Such modes of input can include, but are not limited to, the video channel or the frames of video 140, the audio signal of video 140, and textual information of video 140. The audio signal can include both the background sounds and speech, and the textual information can include the script of video 140 and subtitles (or closed captions) of video 140. Segmentation module 112 can segment a respective mode of input to align with the video segments of video 140 and generate a multimodal input set 120 for analysis module 114. For example, segmentation module 112 can segment the video frames and audio signal of video 140 that belong to segment 146 (e.g., scene 142) to determine video frames 122 and audio signal 124, respectively. Similarly, segmentation module 112 can segment the textual information of video 140 to determine textual information 126 associated with segment 146. Input set 120 can also include additional metadata information 128 (e.g., known metadata and additional embedded information in video 140) associated with segment 146. In this way, input set 120 can include multiple input modalities or modes of input.

Analysis module 114 can apply a corresponding form of AI model on each mode of input in input set 120 and infer semantic contextual information indicating the corresponding classification into a semantic category. For example, analysis module 114 can apply a deep visual classifier on video frames 122 to infer a video classification of segment 146. Analysis module 114 can also apply audio classifier and/or speech recognition on audio signal 124 to infer an audio classification of segment 146. Similarly, analysis module 114 can apply an NLP-based classifier on textual information 126 to infer the text classification of segment 146. In this way, analysis module 114 can obtain multimodal classifications for segment 146 (i.e., from multiple modes of classification). Analysis module 114 can then jointly infer the fusion or unified classification from the multimodal classifications (or the respective embeddings obtained from the classifications) of segment 146.

Based on the unified classification, annotation module 116 can generate an annotation indicator 144 to annotate segment 146 with a respective determined category and a likelihood of segment 146 being in that category. Annotation module 116 may map annotation indicator 144 to segment 146 in a data structure and/or present annotation indicator 144 on display device 108 while showing segment 146 (e.g., scene 142). User 150 can then use annotation indicator 144 to determine whether to watch segment 146. For example, user 150 may skip over segment 146 in the presence of minors.

Furthermore, advertisement module 118 can use contextual information for placing contextually relevant advertisements in video 140. Advertisement module 118 may identify the ISAs in video 140 as potential advertisement spots. Since the ISAs can be between scenes, the ISA-based placement of an advertisement may not interrupt an important sequence or scene in video 140. Consequently, the placement of the advertisements may cause less irritation to user 150. An administrator of the application running on application server 104 may configure the number of times video 140 can be stopped to show one or more advertisements. Based on the number, advertisement module 118 may recommend a set of ISAs for placing the advertisements using one or more policies. For example, the policies can include avoiding or using cliffhangers, avoiding scene fragmentations, and feel-good preceding segments indicated by corresponding annotations.

Suppose that an ISA between segments 146 and 148 in video 140 is selected as an advertisement spot. When the advertisement spot is approaching while video 140 is running, advertisement module 118 can provide the associated contextual information to an advertisement platform. The contextual information can be associated with segments 146 and 148, the last beat in segment 146, and the first beat in segment 148. The contextual information can include one or more keywords representing each of segments 146 and 148, the last beat in segment 146, and the first beat in segment 148. Advertisement module 118 can provide the contextual information to an advertisement system (e.g., an advertisement exchange and/or platform), which can be in communication with system 110 based on an information-sharing protocol. The protocol can facilitate supply-side and/or demand-side advertisement placement.

The advertisement system can dynamically match the contextual information with the content of the available advertisements and place the advertisement that matches the contextual information. For example, if the advertisement system is an advertisement exchange, the advertisement system can provide the contextual information to the bidders. The contextual information (e.g., keywords) can then be used to match the right advertisements in the ISA. Alternatively, an advertisement's owner can buy tags relevant to the business. If the contextual information matches a particular tag, the advertisement can be placed in the corresponding spot between segments 146 and 148. In this way, advertisement module 118 can facilitate the placement of contextually relevant advertisements in video 140.

Segment-Level Annotation

Figure 1B:
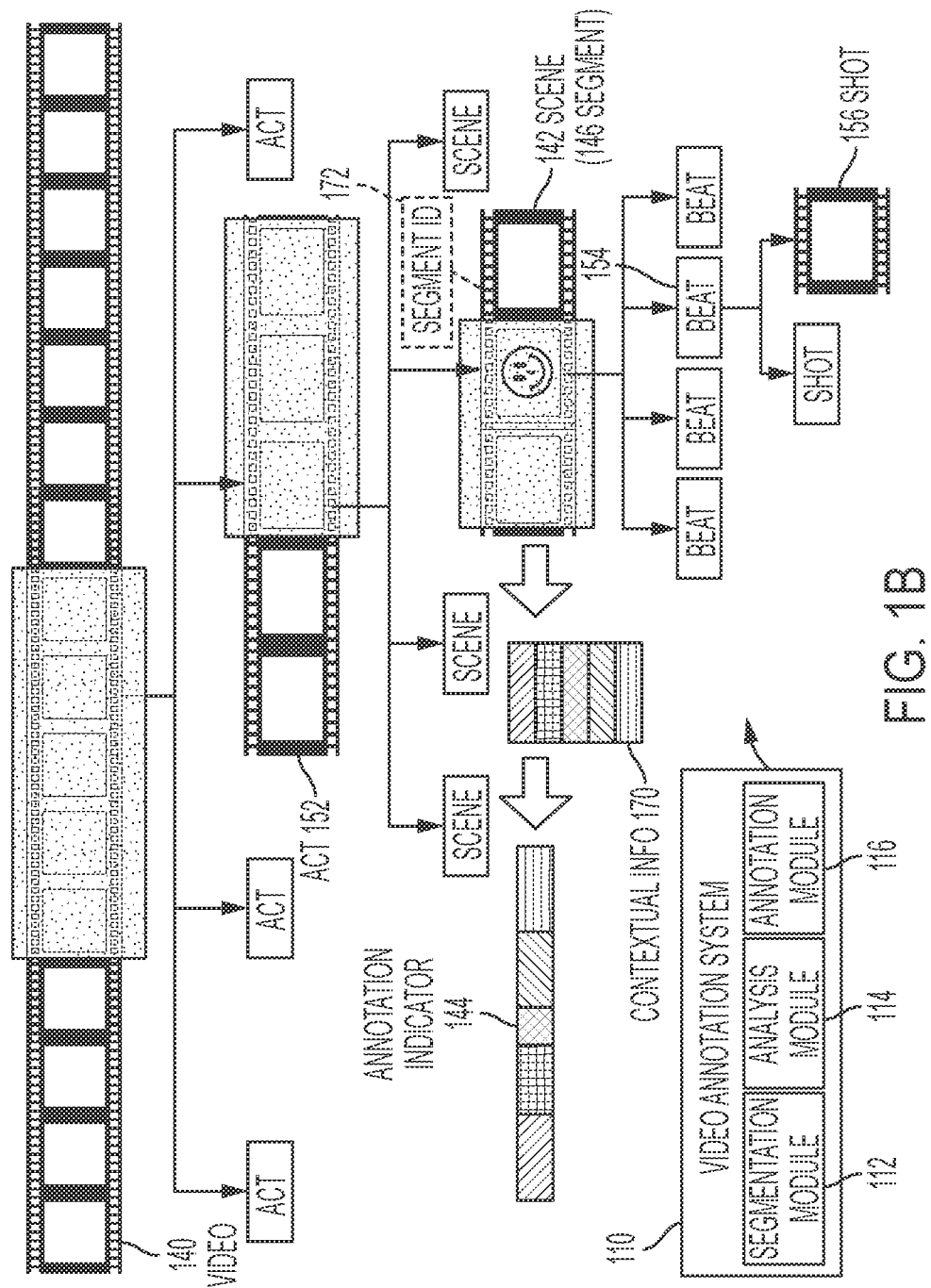
FIG. 1B illustrates an exemplary localized contextual annotation in a video, in accordance with an embodiment of the present application.

FIG. 1B illustrates an exemplary localized contextual annotation in a video, in accordance with an embodiment of the present application. Video 140 can include a set of acts comprising act 152. An act can represent a story-arc in video 140. A respective act can include a number of scenes. A scene can be a unit of action that is confined with respect to a timeframe and/or location. If the action in video 140 moves in time or in location, it would generally be considered as a new scene. Act 152 can include a set of scenes comprising scene 142. A respective scene can further be decomposed into beats. In this example, scene 142 can include a set of beats, which can include beat 154. A respective beat can represent a narration associated with the scene. A respective beat can include one or more shots. Each shot can include a portion of the narration. Here, beat 154 can include a set of shorts comprising shot 156. For example, if scene 142 corresponds to a classroom, a beat in scene 142 can indicate a teacher providing instruction. A shot in that beat can indicate the facial expressions of a student during the instruction delivery process.

When a segmentation unit is set to a particular hierarchical element, segmentation module 112 can facilitate the segmentation of video 140. Segmentation module 112 may decompose video 140 in such a way that each segment can represent a semantic portion of video 140 and contextually relevant within the segment. Therefore, a respective segment may move the story of video 140 forward by providing a semantically meaningful piece of the story. For example, if the semantic contextual way to decompose video 140 is by scenes, segmentation module 112 can segment video 140 based on scenes. Accordingly, segment 146 of video 140 can represent scene 142. Therefore, a respective segment of video 140 can correspond to a scene. Segmentation module 112 can further decompose scene 142 at the narrative beat level within scene 142.

Analysis module 114 can determine multimodal contextual information associated with a respective segment. The multimodal contextual information can include the multimodal classification obtained from the join interference for the segment. Analysis module 114 may optionally determine contextual information associated with a sub-segment within the segment. Subsequently, annotation module 116 can annotate each segment with corresponding contextual information. For example, analysis module 114 can determine multimodal contextual information 170 associated with segment 146 (scene 142). Annotation module 116 can then annotate segment 146 with contextual information 170.

To annotate segment 146 with corresponding contextual information 170, annotation module 116 may maintain a mapping between a segment identifier 172 of segment 146 and contextual information 170. Segment identifier 172 can include one or more of: a video identifier of video 140 and a scene number of scene 142. The video provider application may maintain the mapping in its database (e.g., database 182 in FIG. 1A). Contextual information 170 can include the fused classifications generated by fusing or unifying the multimodal classifications (or the respective embeddings obtained from the classifications).

In some embodiments, contextual information 170 can include contextual information at a beat level. Scene-level contextual information 170 may not necessarily be an aggregation or composite of the corresponding beat-level contextual information. For example, a scene 142 (segment 146) can further be decomposed into a number of beats, such as beat 154. Analysis module 114 can determine multimodal contextual information associated with a respective beat within scene 142. Contextual information 170 can then include both scene-level information and beat-level information associated with beat 154. This allows system 110 to utilize fine-grained analysis of contextual information associated with segment 146.

Furthermore, to provide a visual queue on the screen, annotation module 116 may generate information associated with annotation indicator 144 from contextual information 170 and store the generated information in association with the identifier of segment 146. System 110 can then provide annotation indicator 144 to a video provider service (e.g., an application running on application server 104 in FIG. 1A). The video provider service may display annotation indicator 144 with scene 142 to provide a viewer with a visual queue of contextual information 170.

Figure 2A:
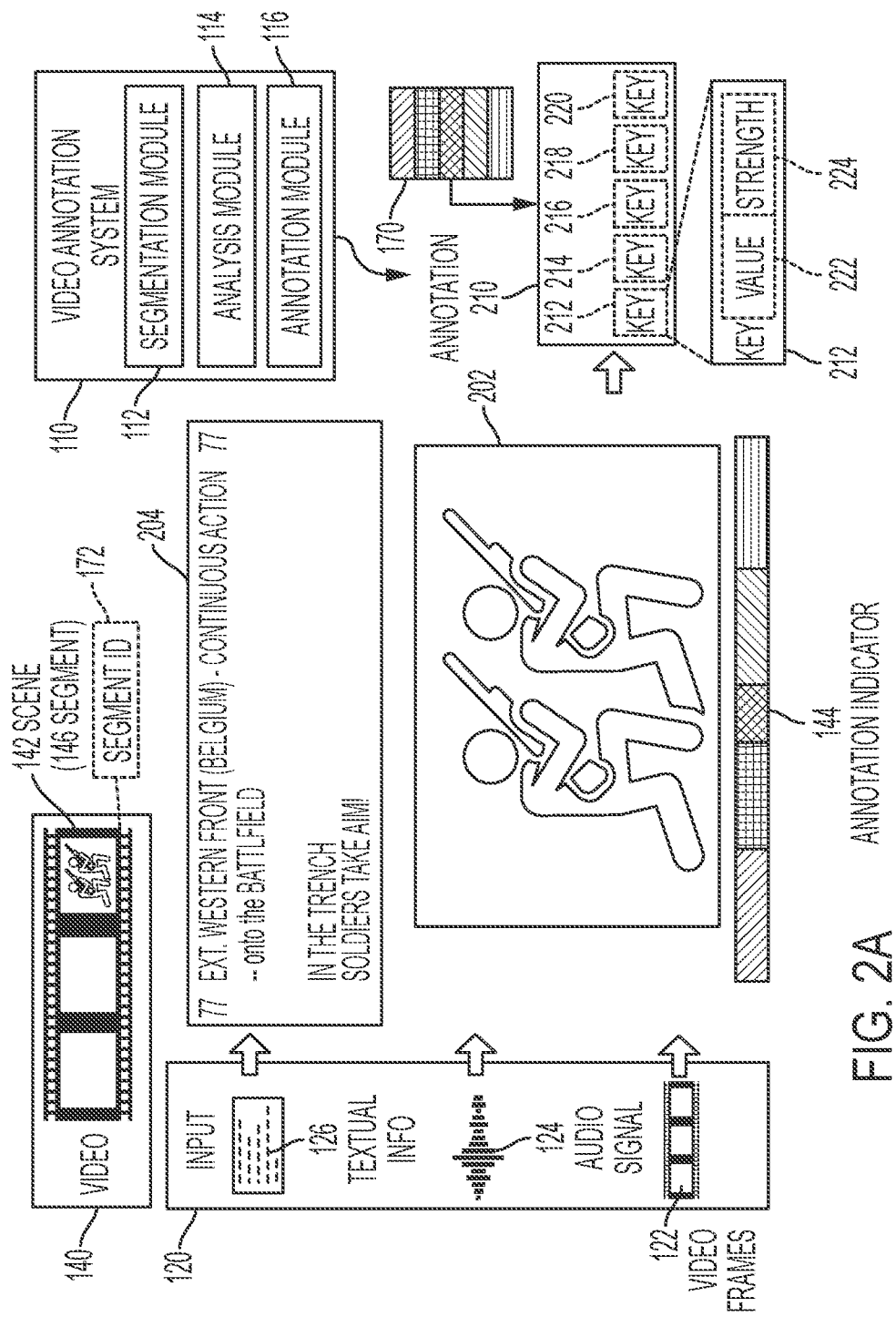
FIG. 2A illustrates an exemplary annotation generation from multimodal contextual information of a video segment, in accordance with an embodiment of the present application.

FIG. 2A illustrates an exemplary annotation generation from multimodal contextual information of a video segment, in accordance with an embodiment of the present application. Input set 120 of segment 120 can include video frames 122, audio signal 124, and textual information 126 associated with segment 146. If video 140 is a movie, video 140 can be accompanied by a script. Typically, the script can be well-structured as a sequence of scenes. For each scene, the script may include a scene number and a heading describing the location and time. For example, if video 140 is a movie titled "Movie X," which can be based on the Second World War, segment 146/scene 142 can then be a scene in Movie X. System 110 can then obtain the script of Movie X from publicly accessible resources (e.g., a web repository for storing movie scripts).

By segmenting the script, segmentation module 112 can then generate textual information 126, which may include a script segment 204 of the Movie X's script associated with scene 142. Script segment 204 can show that scene 142 is the beginning of scene 77. Script segment 204 can also include a heading stating that scene 142 is at an external location in the Western Front of the Second World War. Accordingly, segment identifier 172 can incorporate scene number 77. Segmentation module 112 can also obtain video segment 202 corresponding to script segment 204 by segmenting video 140. From video segment 202, segmentation module 112 may separate the video frames and the corresponding audio signal to generate video frames (or video channel) 122 and audio signal 124, respectively. In other words, based on the definition of a segment (e.g., a scene defined based on location or time change), system 110 can use a combination of video frames, the script (or screenplay), the audio of the video, and other metadata information to perform the segmentation.

Once the video is segmented, analysis module 114 can generate contextual information 170 associated with segment 146 by applying respective AI models on video frames 122, audio signal 124, and textual information 126. Contextual information 170 can include multimodal classification obtained from fusing the respective classifications of the multiple input modalities. Subsequently, annotation module 116 can annotate segment 146 with the fusion or unified classification. Annotation 210 associated with segment 146 can include a set of keys 212, 214, 216, 218, and 220. These keys can represent semantic contextual information associated with scene 142 and one or more beats in scene 142. A respective key can be of the format {key:(value, strength)}. For example, key 212 can include a value 222 and strength 224.

A key, such as key 212, can represent any semantic contextual information associated with segment 146. Hence, the keys can be represented as a scalable list and can be expanded as new keys are added. Typically, key 212 can represent an object, a genre, a concept, or an action associated with segment 146. Key 212 may also represent a rating, characters, and location. Value 222 of key 212 can depend on the type of key 212 and can a feature of segment 146. Strength 224 can be a number (e.g., between 0 and 1) that indicates the likelihood of the presence of the given value (e.g., a strength level or confidence level). For example, if key 212 represents the category (or genre) of segment 146, value 222 can be one of: action, adventure, comedy, crime, drama, fantasy, horror, musical, mystery, romance, and sci-fi. On the other hand, if key 212 represents a rating of segment 146, value 222 can be one of: violence, language, nudity, and horror.

Strength 224 can then indicate the likelihood of the category being a particular genre. Accordingly, if value 222 is "action," strength 224 can indicate the likelihood of segment 146 being in the action genre. As shown in FIG. 2A, if segment 146 corresponds to a battlefield scene in Movie X, strength 224 can be close to 1 if value 222 is "action." Exemplary keys for segment 146 can then include, but are not limited to, {"genre": ("action", 0.71)}, {"genre": ("comedy", 0.33)}, {"genre": ("intimate", 0.2)}, {"object": ("person", 0.9)}, {"concept": ("war", 0.95)}, {"action": ("fighting", 0.9)}, and {"rating": ("violence", 0.9)}. Some keys, such as genre, may not be mutually exclusive. For example, segment 146 can be associated with more than one genre.

If keys 212, 214, 216, 218, and 220 represent semantic categories (e.g., genres), annotation module 114 can generate a normalized representation of the semantic categories (i.e., the values) associated with the keys. To incorporate annotation 210 with segment 146, annotation module 114 can present a normalized representation of the strengths of the values associated with each key. Since the values of keys 212, 214, 216, 218, and 220 can represent categories, the strengths can correspond to the likelihood of segment 146 belonging to the categories. The normalization can be based on a value of 1 (or 100). The likelihood of segment 146 being in a specific category is represented with an annotation value between 0 and 1, and the summation of the annotation values of all categories can be 1. In some embodiments, each of the annotation values associated with segment 146 can be expressed with a distinct representation (e.g., with a color, fill-pattern, or value) and represented in annotation indicator 144. Subsequently, system 110 can provide the annotation indicator to a video provider, which can then display annotation indicator 144 with segment 146.

Annotation 210 can facilitate a personalized viewing option for a viewer. System 110 may allow a user to select the set of values of key 212 for annotation 210. The viewer may choose to automatically skip through items in video 140 that belong to a particular category. If strength 224 is greater than a threshold, it may indicate that segment 146 belongs to a category corresponding to key 222. If a viewer wishes to skip the category, segment 146 can automatically be skipped when video 140 plays. On the other hand, the viewer may also select to watch the segments that belong to that category. Under such circumstances, only the segments that belong to the category can be played when video 140 plays. System 110 can maintain the starting and ending timestamps of segment 146. Consequently, to skip segment 146, whenever the starting timestamp of segment 146 is detected, video 140 can skip to the ending timestamp. Similarly, to show segment 146, whenever a previous segment belonging to the category ends playing, video 140 continues playing from the starting timestamp of segment 146.

Figure 2B:
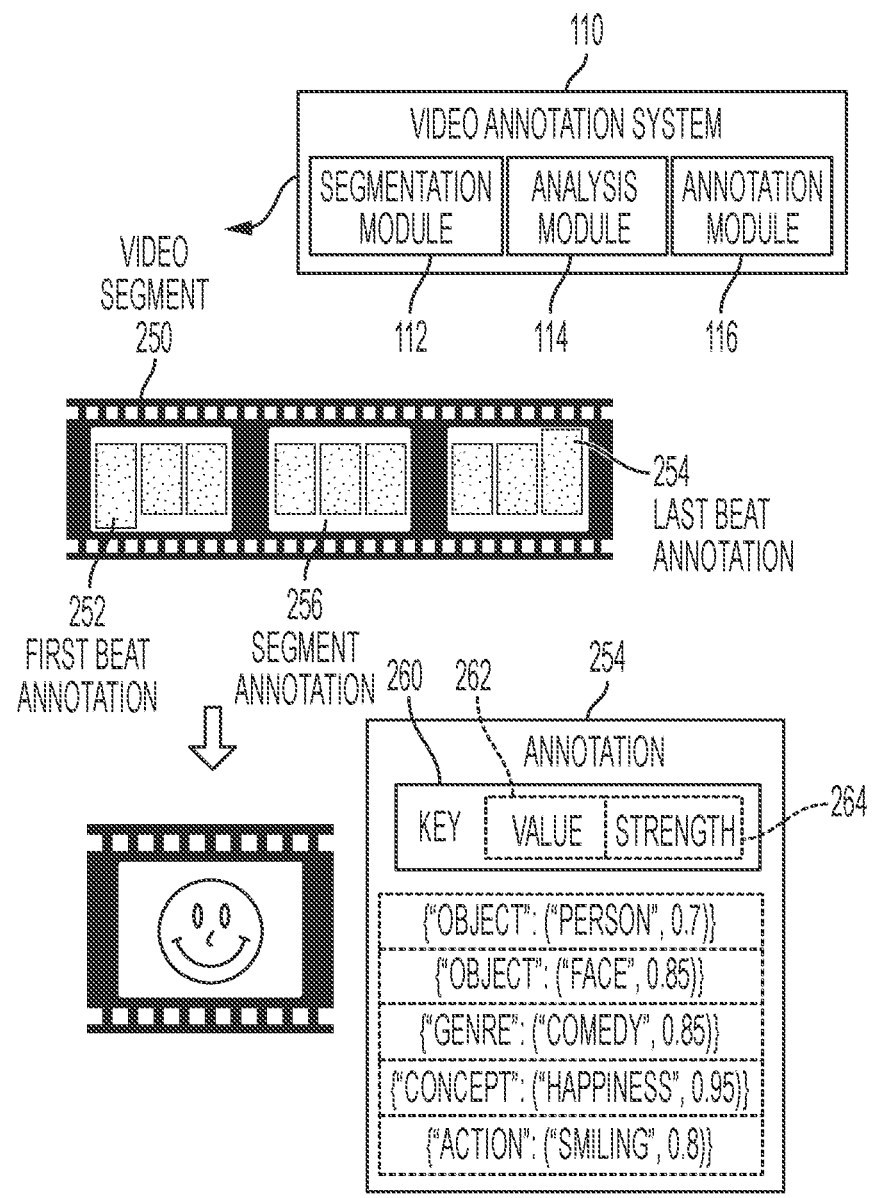
FIG. 2B illustrates exemplary localized annotations associated with a video segment, in accordance with an embodiment of the present application.

FIG. 2B illustrates exemplary localized annotations associated with a video segment, in accordance with an embodiment of the present application. Localized annotation can include both scene-level annotation and beat-level annotation. This allows system 110 to annotate a video segment 250 in such a way that different applications, such as an advertisement system, can utilize annotation 250. For example, the annotation for segment 250 can include segment annotation 256 for entire segment 256, first beat annotation 252 for the first beat of segment 250, and last beat annotation 254 for the last beat of segment 250. The keys in a beat-level can represent semantic contextual information associated with a corresponding beat in segment 250. Here, annotation 254 can include a set of keys associated with the last beat of segment 250.

A respective key in annotation 254 can be of the format {key:(value, strength)}. For example, a key 260 in annotation 254 can include a value 262 and strength 264. Exemplary keys in annotation 254 can then include, but are not limited to, {"object": ("person", 0.7)}, {"object": ("face", 0.85)}, {"genre": ("comedy", 0.85)}, {"concept": ("happiness", 0.95)}, and {"action": ("smiling", 0.8)}. Some keys may not be mutually exclusive. For example, a beat can be associated with more than one object. Annotation 254 can help an application to operate in a contextual way. If the application is related to advertisement placement, the application can determine from annotation 254 that segment 250 has ended on a happy note, and any advertisement placed after segment 250 should narrate a story of happiness. Therefore, combining segment-level and beat-level annotations can efficiently and accurately contextualize segment 250.

System Architecture

Figure 3A:
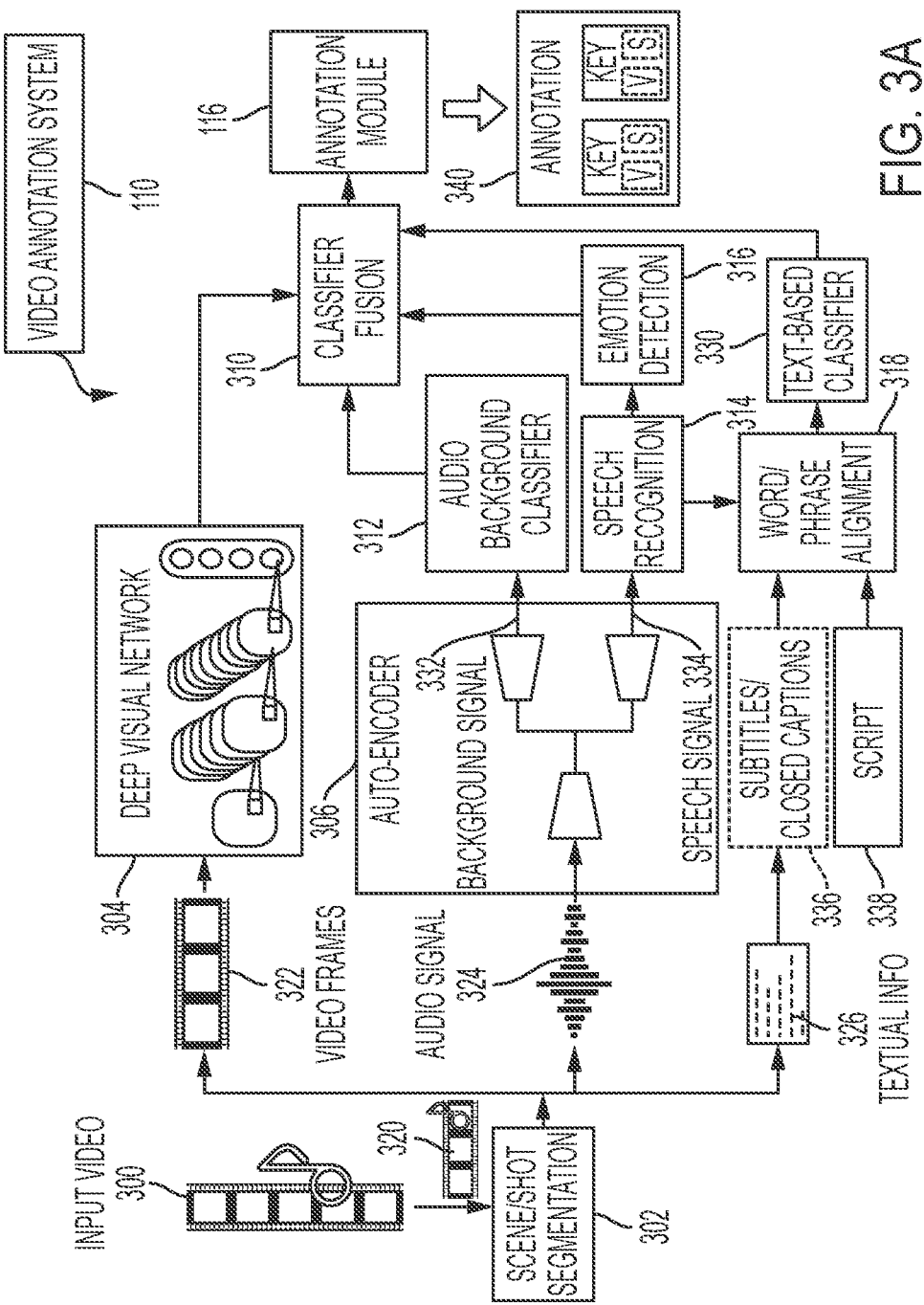
FIG. 3A illustrates an exemplary process of generating localized contextual annotation for a video segment using classification-based multimodal fusion, in accordance with an embodiment of the present application.

FIG. 3A illustrates an exemplary process of generating localized contextual annotation for a video segment using classification-based multimodal fusion, in accordance with an embodiment of the present application. System 110 can infer semantic contextual information from joint inference over multiple input modalities. During operation, system 110 can obtain an input video 300. System 110 can then process video 300 using a scene (or shot) segmentation technique 302 to split video 300 into a set of segments (e.g., constituent scenes or shots of video 300), such as segment 320. Here, segment 320 may include video frames, an audio signal, and textual information. System 110 can further parse segment 320 into the constituent signal modalities, such as video frames 322, audio signal 324, and textual information 326, such as subtitles/closed captions 336, if available. System 110 may use video editing tools, such as an audio/video (AV) converter and a subtitle extractor, to perform the parsing operation on a respective segment.

Alternatively, system 110 may parse video 300 to obtain the video frames, audio signal, and textual information for video 300. System 110 can then segment the video frames of video 300 into a number of video frame segments, one of which can be video frames 322, and determine the corresponding timestamps. System 110 can then segment the extracted audio and textual information to align with the corresponding video frame segments, thereby generating audio signal 324 and textual information 326.

System 110 can further incorporate external input modalities, such as script 338 of video 300. Script 338 can be considered another form of textual information 326, which can then include subtitles/closed captions 336 and script 338. System 110 can then process video frames 322 are processed using a visual recognition technique, which can include a deep visual network 304 that can infer scene categories or classes from the pixel data in video frames 322. Deep visual network 304 can include a deep neural network (DNN), such as a convolutional neural network (CNN). Furthermore, to capture temporal dynamics, deep visual network 304 may include a recurrent neural network (RNN) in conjunction with the CNN. The combination of CNN and RNN in deep visual network 304 can be trained to infer semantic classes, objects, and/or people in segment 320 (i.e., determine the corresponding labels) based on pre-labeled training data. The detected class, object, and/or people can be the visual semantic contextual information of segment 320.

System 110 can analyze, serially or in parallel, audio signal 324 using a separate audio processing technique, which can include a deep-stacked autoencoder 306. Autoencoder 306 can learn a latent low-dimensional embedding of audio signal 324. Autoencoder 306 may include an encoder followed by two decoder streams that recover background non-verbal signal 332, such as music and special effects, and human speech signal 334, respectively. The separation of verbal and non-verbal signals can be used to determine scene properties. For example, background music is often indicative of genre, pace, tension, etc. During training, autoencoder 306 can learn to reconstruct audio signal 324 based on an implicit model for remixing the separated background signal 332 and speech signal 334. The mixing model can operate based on an appropriate representation, such as mel-frequency cepstral coefficients.

Subsequently, system 110 can process background signal 332 using an audio background classifier 312 that can infer relevant scene properties (i.e., determine the corresponding labels). Classifier 312 may include input-based features, such as a spectrogram, in combination with machine learning techniques, such as a support vector machine or a random forest. Classifier 312 may also be a DNN trained on end-to-end video signals to infer scene properties directly. Classifier 312 can also include a hybrid model. The hybrid model may use a DNN to determine discriminative embeddings. System 110 can then provide the discriminative embeddings to a non-deep learner, such as a random forest classifier.

On the other hand, system 110 can process speech signal 334 using a speech recognition technique 314, which can include a DNN with a memory component, such as an RNN based on Long-Short-Term Memory (LSTM). Speech recognition technique 314 may generate texts from speech signal 334. System 110 can use an emotion detection technique 316 on the texts generated by speech recognition technique 314 to infer the emotion and vibe of segment 320. Furthermore, system 110 may use subtitles/closed captions 336 in place of or for augmenting speech recognition technique 314. System 110 can align and augment the texts from the combination of speech recognition 314, subtitles/closed captions 336, and script 338 using a word/phrase alignment technique 318. System 110 can then provide the aligned texts to a text-based scene classifier 330 as an input.

Classifier 330 can extract meaningful embeddings that may infer contextual information, such as sentiment, emotion, and genre associated with segment 320 (i.e., determine the corresponding labels) from the aligned texts. Emotion detection technique 316 and/or classifier 330 can be based on natural language processing (NLP). System 110 can then fuse the classifications, predictions, and/or scores from each of the visual, audio, and text classifiers based on a classifier score fusion technique 310 and generate jointly inferred contextual information from the multiple input modalities associated with segment 320. Classifier score fusion technique 310 may use majority classification and/or weighted classification to determine the classifications associated with segment 320. Annotation module 116 of system 110 can obtain the contextual information and generate an annotation 340 for segment 320. Annotation 340 can include a set of keys representing the contextual information. System 110 can repeat this process for a respective segment of input video 300.

Figure 3B:
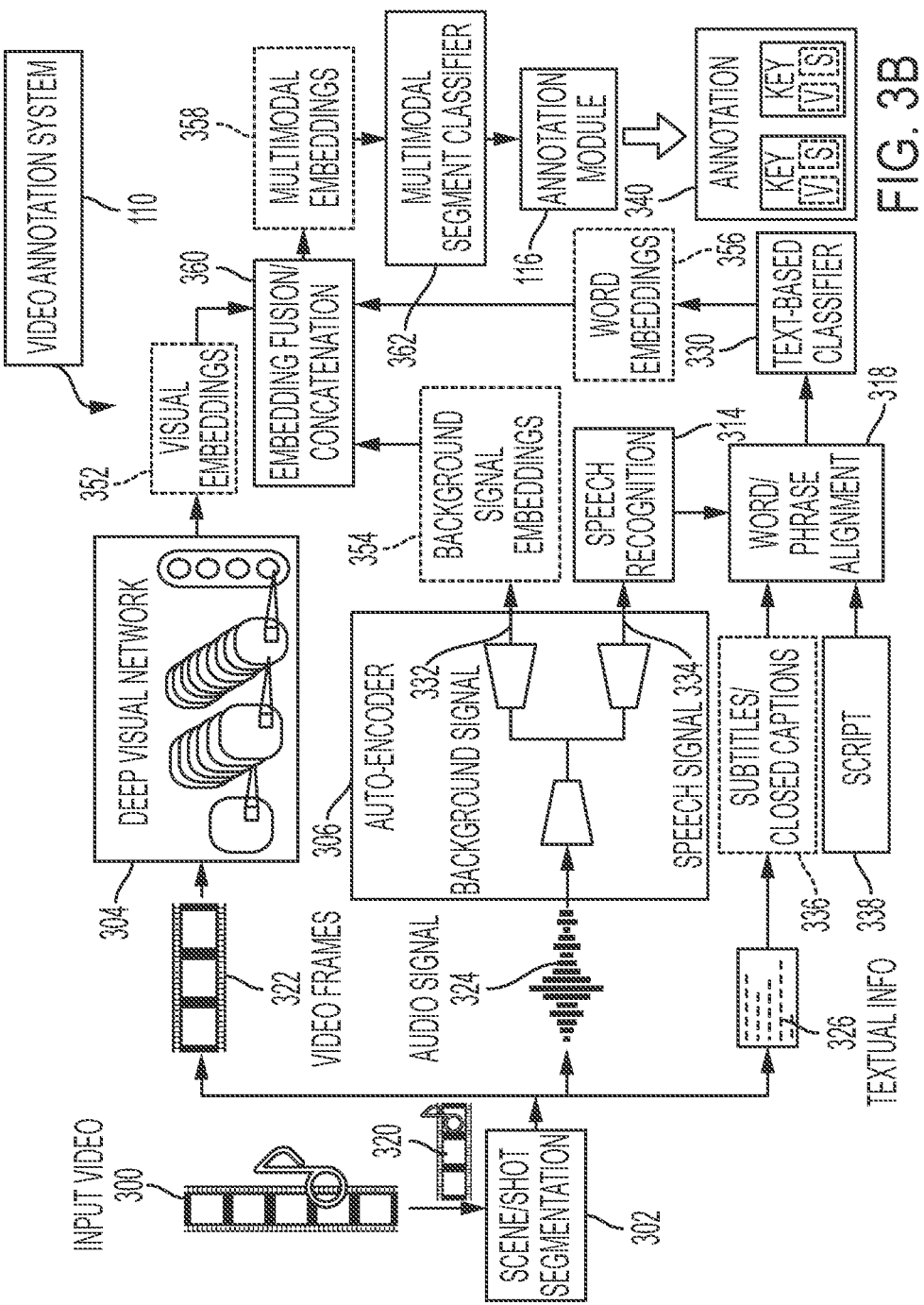
FIG. 3B illustrates an exemplary process of generating localized contextual annotation for a video segment using embedding-based multimodal fusion, in accordance with an embodiment of the present application.

Here, classifier score fusion technique 310 is applied to the classifications obtained from the classifications generated from the visual, audio, and text classifiers. Therefore, classifier score fusion technique 310 can be considered a "late fusion" strategy. Instead of performing a late fusion on the classifications based on individual input modalities, system 110 may also fuse the early- or mid-level embeddings from the input modalities and apply a unified multimodal classifier on the fused multimodal embeddings. FIG. 3B illustrates an exemplary process of generating localized contextual annotation for a video segment using embedding-based multimodal fusion, in accordance with an embodiment of the present application. Here, system 110 can use embedding-based multimodal fusion instead of classification-based multimodal fusion.

Embedding-based multimodal fusion obtains vector embeddings derived for each of the input modalities for segment 320 and fuses them into a multimodal embedding. For example, system 110 can obtain visual embeddings 352 from deep visual network 304, background signal embeddings 354 from autoencoder 306, and word embeddings 356 from text-based classifier 330 (e.g., a word2vec NLP model). In some embodiments, system 110 can use a DNN to learn the embeddings from a corresponding classifier automatically. It should be noted that embeddings associated with a particular mode of input can be obtained by a user from the intermediate states of a corresponding classifier.

System 110 can then apply an embedding fusion/concatenation technique 360 on these embeddings to generate multimodal embeddings 358. System 110 may obtain feature embeddings from deep visual network 304, autoencoder 306, and text-based classifier 330, and fuse the embeddings at a concatenation layer representing multimodal embeddings 358. System 110 can then provide multimodal embeddings 358 to a multimodal segment classifier 362 as an input. Classifier 362 can infer the properties of interest for segment 320 based on multimodal embeddings 358. To do so, system 110 can then incorporate the concatenation layer into classifier 362, which in turn can provide the classification labels at the output layer.

In some embodiments, system 110 may use a variant of embedding-based and/or classification-based multimodal fusion. For example, embeddings 354 and 356 associated with audio and texts, respectively, can be inserted into deep visual classifier 304 at an appropriate layer in a later stage. Classifier 304 can then be trained, by incorporating embeddings 354 and 356, to infer multimodal contextual information associated with segment 320. Annotation module 116 of system 110 can then obtain the contextual information and generate an annotation 340 for segment 320. Annotation 340 can include a set of keys representing the contextual information. System 110 can repeat this process for a respective segment of input video 300.

Advertisement System

Figure 4:
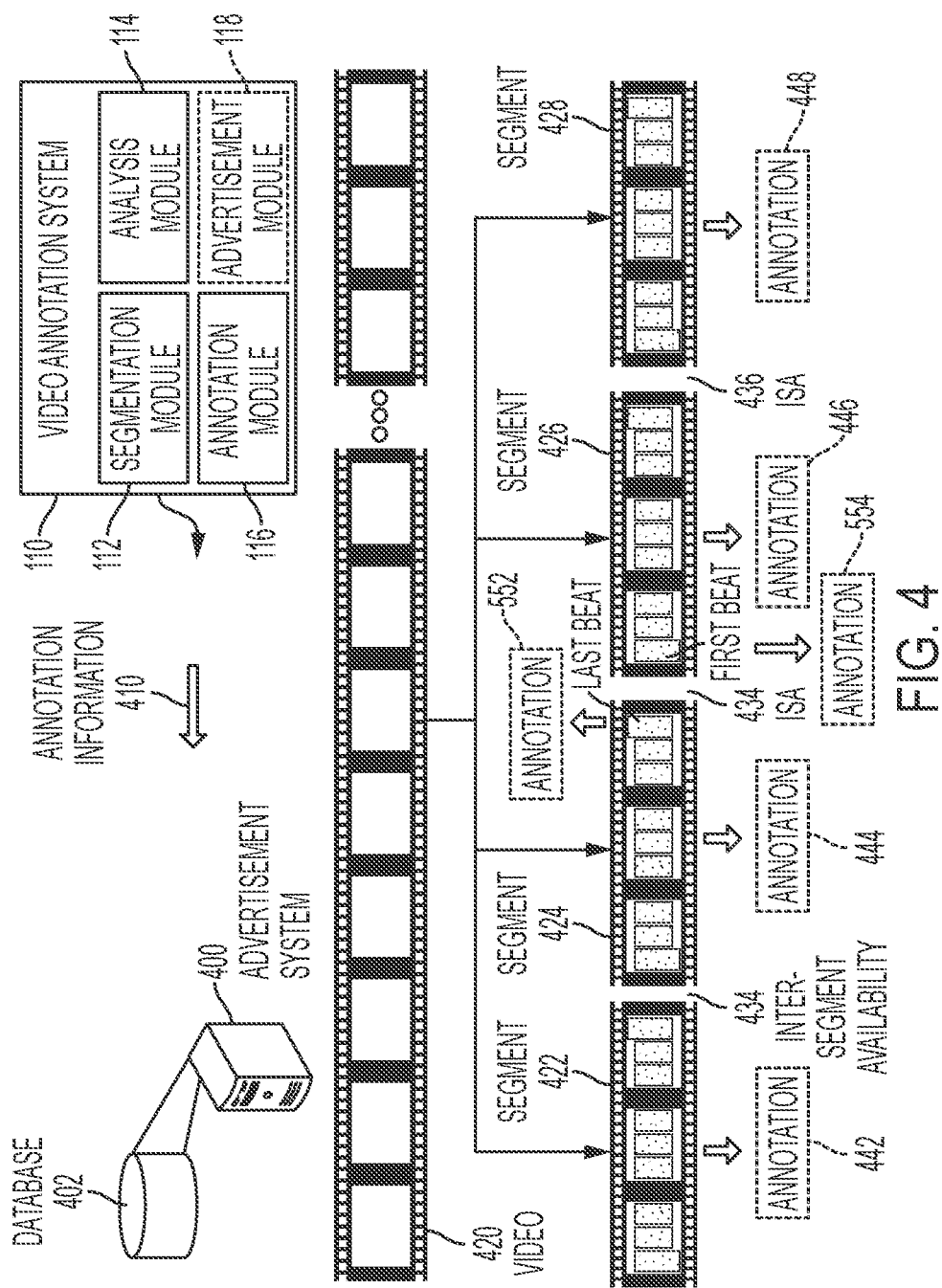
FIG. 4 illustrates an exemplary advertisement placement process in a video based on localized contextual information, in accordance with an embodiment of the present application.

The annotations generated by system 110 can be used for other applications, such as an advertisement system. The advertisement system can place contextually relevant advertisements in a video based on the annotation obtained from system 110. FIG. 4 illustrates an exemplary advertisement placement process in a video based on localized contextual information, in accordance with an embodiment of the present application. Segmentation module 112 can obtain a video 420 and segment video 420 into a number of segments 422, 424, 426, and 428. Analysis module 114 can infer contextual information associated with a respective segment based on multiple input modalities of the segment.

Using the contextual information, annotation module 116 can generate annotation 442, 444, 446, and 448 for segments 422, 424, 426, and 428, respectively. Annotation module 116 can also generate beat-level annotation for one or more beats in a respective segment, such as annotation 552 for the last beat of segment 424 and annotation 554 for the first beat of segment 426. Advertisement module 118 of system 110 can then identify ISAs 432, 434, and 436 in video 420 as potential advertisement spots. In this way, the placement of an advertisement in an ISA of video 420 may not interrupt a scene in video 420 because each segment may include a scene.

An administrator may configure the number of times video 420 can be stopped to show advertisements. Based on the number, advertisement module 118 may recommend a set of ISAs for placing advertisements in video 420. Advertisement module 118 may apply one or more policies to the annotations to select a set of ISAs that can be used for placing advertisements. Such policies can include, but are not limited to, maximizing monetization, avoiding or using cliffhangers, avoiding scene fragmentations, and feel-good preceding segments. Suppose that the number of times video 420 can be stopped is configured to be one. Advertisement module 118 can then select one of ISAs 432, 334, and 436 for placing advertisements. For example, advertisement module 118 may select an ISA at which a user may become susceptible to the narrative of an advertisement. Advertisement module 118 can examine the annotations, evaluate the emotional information, and determine the susceptibility (e.g., based on a weighted score applied to the semantic categories and their corresponding confidence values).

If advertisement module 118 selects ISA 434, advertisement module 118 can provide annotation information 410 to an advertisement system 400 (e.g., an advertisement exchange and/or platform). Annotation information 410 can include annotations 444 and 446 of the preceding and subsequent segments 424 and 426 of ISA 434, respectively. Annotation information 410 can also include annotation 552 of the last beat in segment 424, and annotation 554 of the first beat in segment 426. Advertisement system 400 can maintain the available advertisements and their respective content and narrative (e.g., expressed as a set of keywords for each advertisement) in database 402.

Upon obtaining annotation information 410, advertisement system 400 can dynamically match the annotations in annotation information 410 with a corresponding advertisement that can be placed in ISA 434. To perform the matching operation, advertisement system 400 can obtain values and strengths from the keys in the annotations, and select a set of values with corresponding strengths greater than a threshold. Advertisement system 400 can then match the keywords describing the content and narrative of the available advertisements with one or more of the selected values, and pick an advertisement with the best match. The matching operation can be based on one or more database queries performed on database 402.

Alternatively, an enterprise that owns an advertisement or an agent of the enterprise can buy tags relevant to the business from advertisement system 400. For example, if the enterprise is an insurance company, the enterprise can buy tags related to accidents, fire, explosions, etc. If segment 424 and/or segment 426 correspond to action sequences that include a car chase and/or vehicular damage, the annotations in annotation information 410 would represent the actions. Since the corresponding values in the annotations can match the tag of the advertisement, advertisement system 400 can determine that the advertisement can be placed in ISA 434. In this way, the annotation can facilitate the placement of contextually relevant advertisements in video 420.

Typically, if video 420 is a popular video, such as a movie, product placement in video 420 can be an effective form of advertisement. However, such product placement can be expensive. Contextual advertising within video 420 can become a cost-effective alternative. If a viewer watches the protagonist drive a luxury car on the highway in segment 424, contextual advertising allows advertisement system 400 to show a luxury car advertisement right after segment 424 in ISA 434. The contextual approach can be used in advertisement overlays as well. Furthermore, since some video provider requires a subscription, the video provider may also know viewer information (e.g., gender, ethnicity, age, income bracket, etc.). Combining viewer information and contextual information can further improve the effectiveness of contextual advertising in video 420.

Operations

Figure 5A:
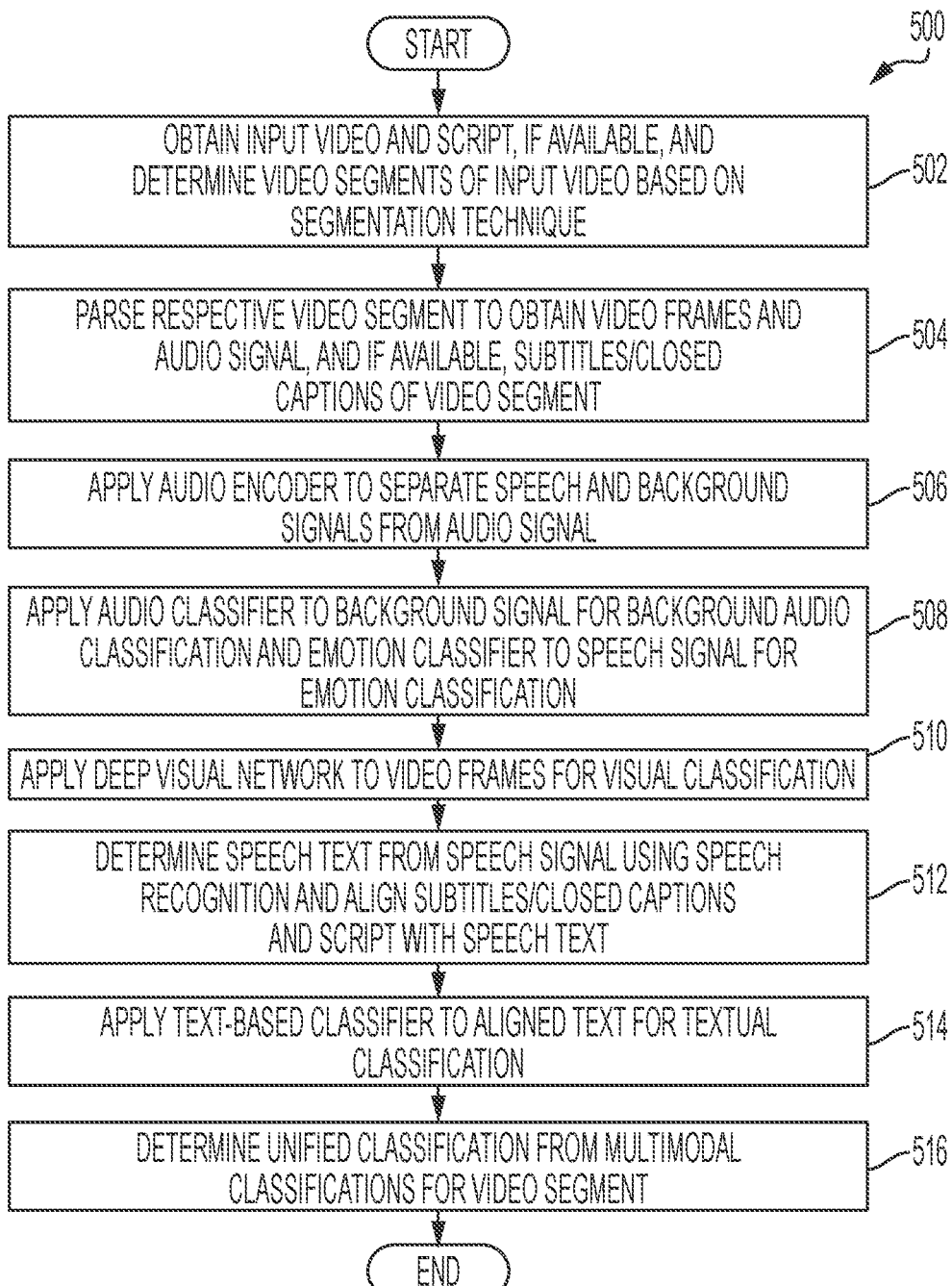
FIG. 5A presents a flowchart illustrating a method of a video annotation system generating multimodal classifications for a video segment using classification-based multimodal fusion, in accordance with an embodiment of the present application.

FIG. 5A presents a flowchart illustrating a method 500 of a video annotation system generating a unified classification for a video segment using classification-based multimodal fusion, in accordance with an embodiment of the present application. During operation, the system can obtain an input video and an associated script, if available, and determine video segments of the input video based on a segmentation technique (operation 502). The system can then parse a respective video segment to obtain video frames and audio signal, and if available, subtitles/closed captions of the video segment (operation 504). Subsequently, the system can apply an audio encoder to separate speech and background signals from the audio signal (operation 506).

The system can apply an audio classifier to the background signal for audio classification and an emotional classifier to the speech signal for emotion classification (operation 508). The system can further apply a deep visual network to the video frames for visual classification (operation 510). The system can also determine speech text from the speech signal using the speech recognition and align the subtitles/closed captions and the script with the speech text (operation 512). The system can then apply a text-based classifier (e.g., an NLP-based classifier) to the aligned text for textual classification (operation 514). Subsequently, the system can determine a unified classification from the multimodal classifications for the video segment (operation 538).

Figure 5B:
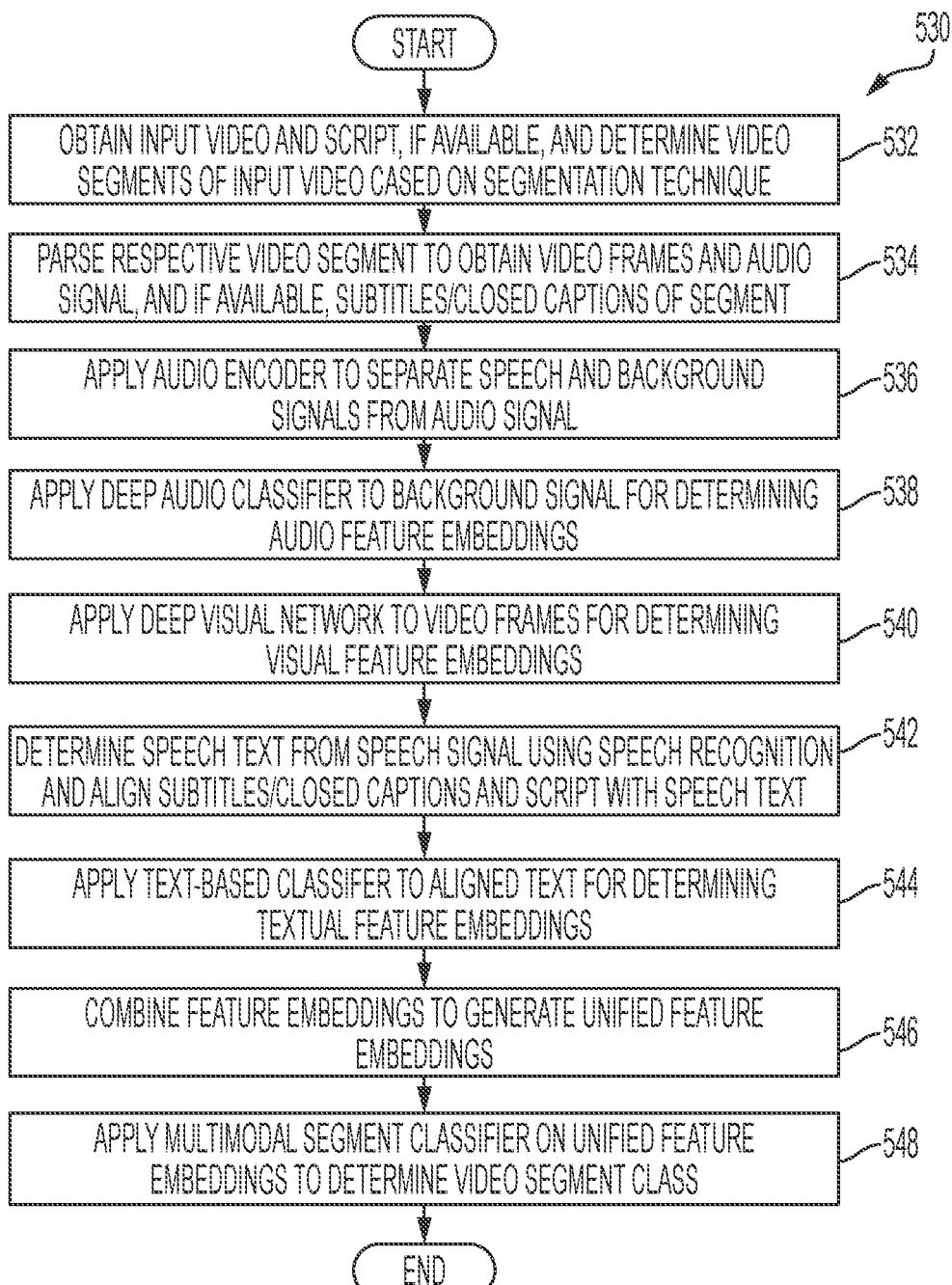
FIG. 5B presents a flowchart illustrating a method of a video annotation system generating a unified classification for a video segment using embedding-based multimodal fusion, in accordance with an embodiment of the present application.

FIG. 5B presents a flowchart illustrating a method 530 of a video annotation system generating a unified classification for a video segment using embedding-based multimodal fusion, in accordance with an embodiment of the present application. During operation, the system can obtain an input video and an associated script, if available, and determine video segments of the input video based on a segmentation technique (operation 532). The system can then parse a respective video segment to obtain video frames and audio signal, and if available, subtitles/closed captions of the video segment (operation 534). Subsequently, the system can apply an audio encoder to separate speech and background signals from the audio signal (operation 536).

The system can apply an audio classifier to the background signal for determining audio feature embeddings (operation 538). The system can further apply a deep visual network to the video frames for determining visual feature embeddings (operation 540). The system can also determine speech text from the speech signal using the speech recognition and align the subtitles/closed captions and the script with the speech text (operation 542). The system can then apply a text-based classifier to the aligned text for determining textual feature embeddings (operation 544). Subsequently, the system can combine the feature embeddings to generate unified feature embeddings (operation 546) and apply a multimodal segment classifier on the unified feature embeddings to determine the video segment class (operation 548).

Figure 5C:
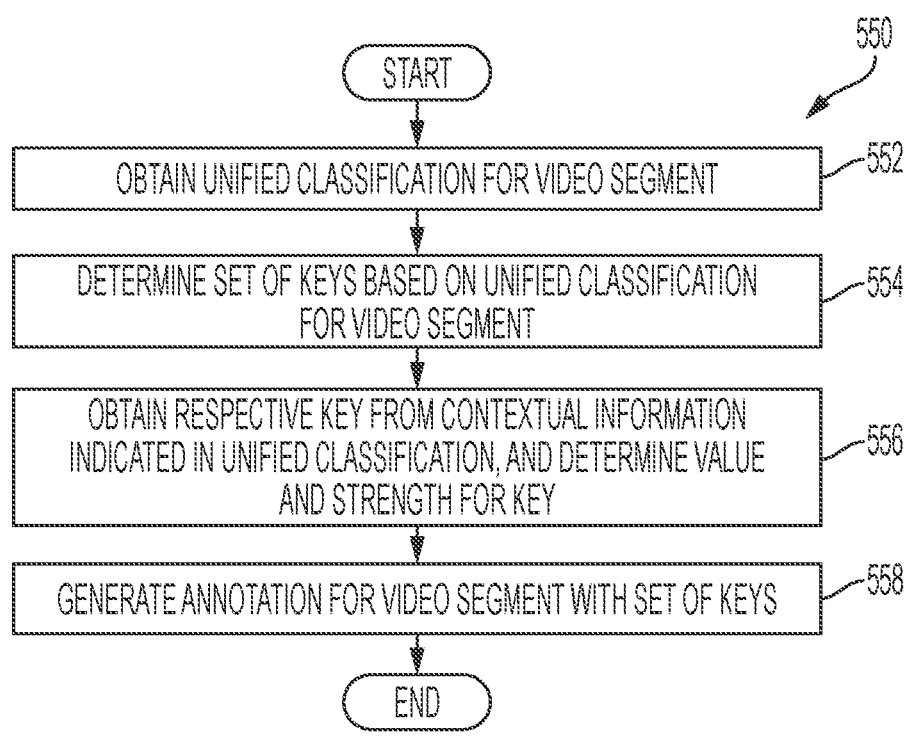
FIG. 5C presents a flowchart illustrating a method of a video annotation system generating an annotation based on a unified classification of a video segment, in accordance with an embodiment of the present application.

FIG. 5C presents a flowchart illustrating a method 550 of a video annotation system generating an annotation based on a unified classification of a video segment, in accordance with an embodiment of the present application. During operation, the system can obtain a unified classification for a video segment (operation 552) and determine a set of keys based on the unified classification for the video segment (operation 554). A user may select and configure the set of keys for the video segment. The system can then obtain a respective key from the contextual information in the unified classification, and determine a value and strength for the key (operation 556). Subsequently, the system can generate annotation for the video segment with the set of keys (operation 558).

Figure 6:
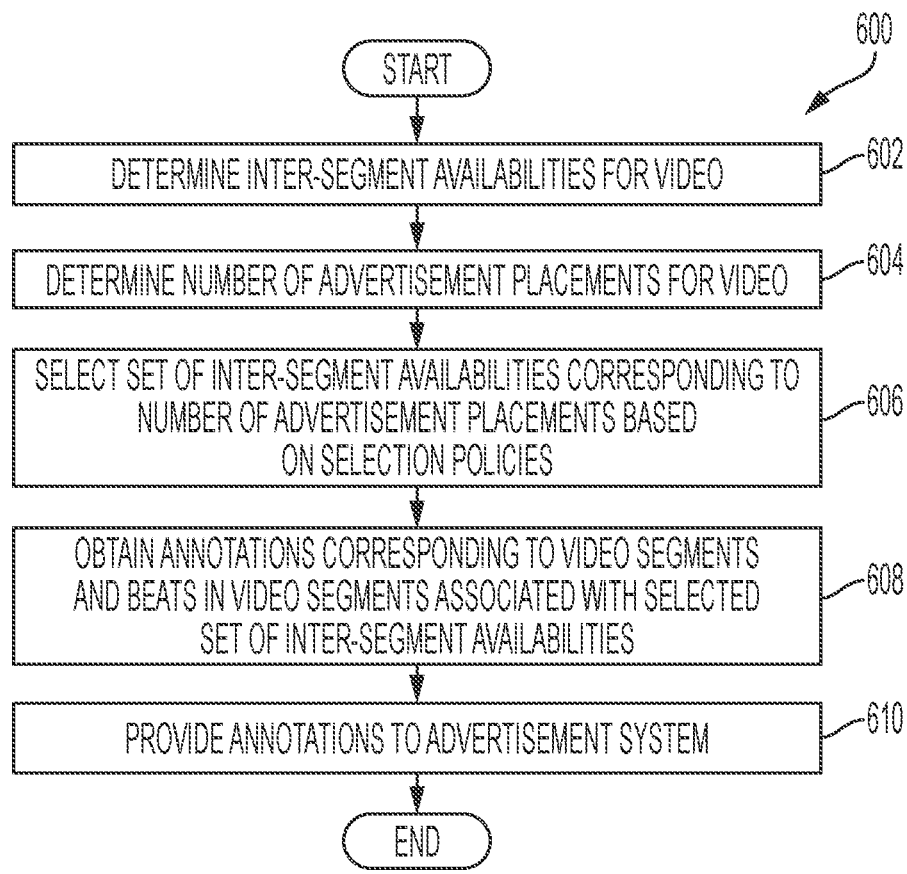
FIG. 6 presents a flowchart illustrating a method of a video annotation system providing annotation information for placing advertisements in a video, in accordance with an embodiment of the present application.

FIG. 6 presents a flowchart illustrating a method 600 of a video annotation system providing annotation information for placing advertisements in a video, in accordance with an embodiment of the present application. During operation, the system can determine ISAs for an input video (operation 602) and determine the number of advertisement placements for the video (operation 604). The system can then select a set of ISAs corresponding to the number of advertisement placements based on one or more selection policies (operation 606). Subsequently, the system can obtain annotations corresponding to video segments and beats in the video segments associated with the selected set of ISAs (operation 608). The system can provide the annotations to an advertisement system (operation 610).

Exemplary Computer System and Apparatus

Figure 7:
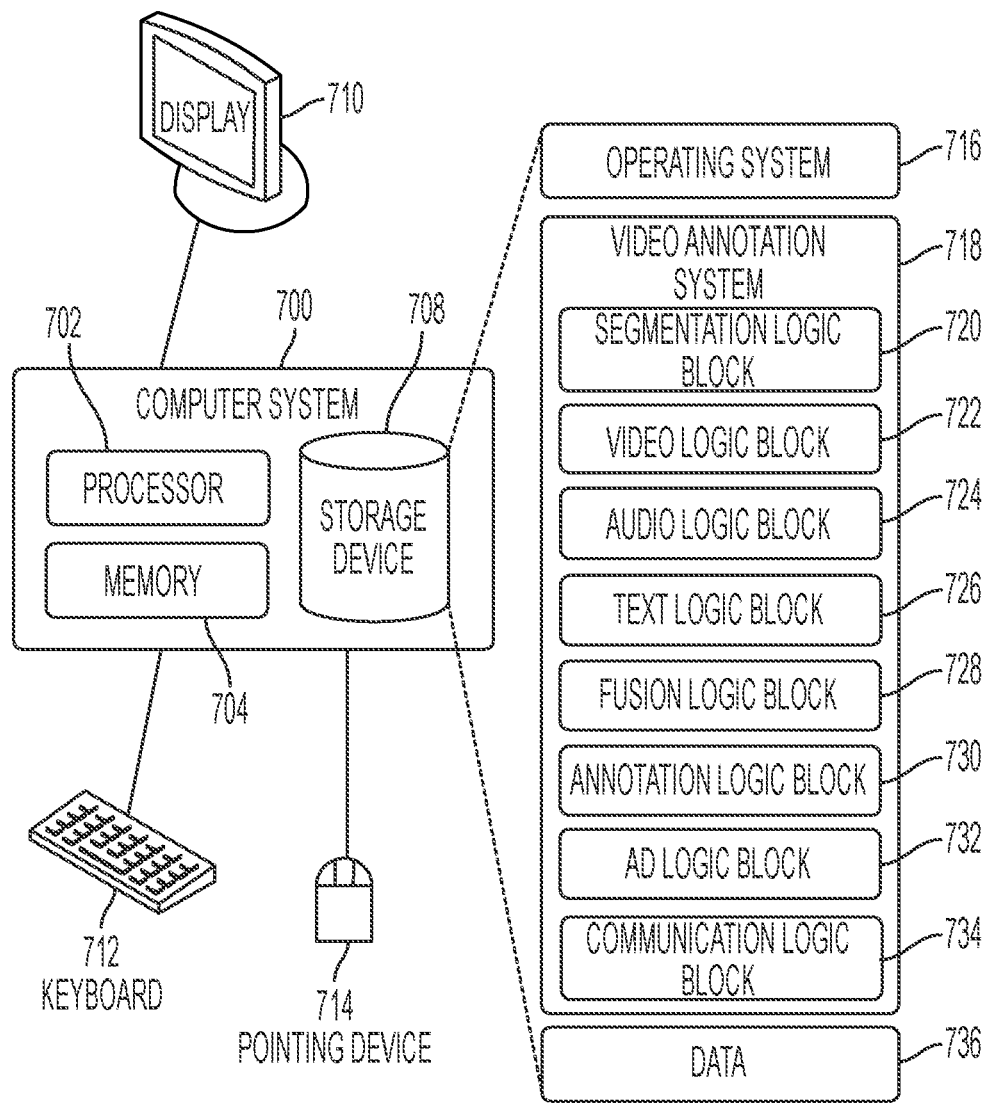
FIG. 7 illustrates an exemplary computer system facilitating a video annotation system that supports localized contextual annotation for a video, in accordance with an embodiment of the present application.

FIG. 7 illustrates an exemplary computer system facilitating a video annotation system that supports localized contextual annotation for a video, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a video annotation system 718, and data 736. Video annotation system 718 can incorporate the operations of system 110.

Video annotation system 718 can include instructions, which when executed by computer system 700 can cause computer system 700 to perform methods and/or processes described in this disclosure. Specifically, video annotation system 718 can include instructions for segmenting a video into video segments based on a segmentation unit (segmentation logic block 720). Video annotation system 718 can also include instructions for parsing a respective video segment for obtaining multiple input modalities (segmentation logic block 720). Furthermore, video annotation system 718 includes instructions for obtaining semantic contextual classification for the video frames of a respective video segment (video logic block 724).

Video annotation system 718 can also include instructions for separating background and speech signals from an audio channel of a respective video segment (audio logic block 724). Video annotation system 718 can further include instructions for obtaining semantic contextual classification for the background signal and speech texts from the speech signal (audio logic block 724). Moreover, video annotation system 718 can include instructions for aligning speech text with the textual information of the corresponding video segment (text logic block 726). Video annotation system 718 can also include instructions for obtaining semantic contextual classification for the aligned text (text logic block 726).

Video annotation system 718 can include instructions for fusing the multimodal classifications and determine a unified classification (fusion logic block 728). Video annotation system 718 can also include instructions for fusing the embedding from the multimodal classifications to determine multimodal embeddings and determine a unified classification from the multimodal embeddings (fusion logic block 728). Moreover, video annotation system 718 can include instructions for generating annotations for a respective video segment from the unified classification (annotation logic block 730).

In some embodiments, video annotation system 718 can include instructions for determining ISAs in a video and providing annotation information associated with the ISAs to an advertisement system (ad logic block 732). Video annotation system 718 may further include instructions for sending and receiving messages (e.g., packets and frames) (communication logic block 734). Data 736 can include any data that can facilitate the operations of system 110. Data 736 may include one or more of: training data for different classifiers, multimodal information for the segments of one or more videos, classification and embedding information for the segments, and ISA information for the videos.

Figure 8:
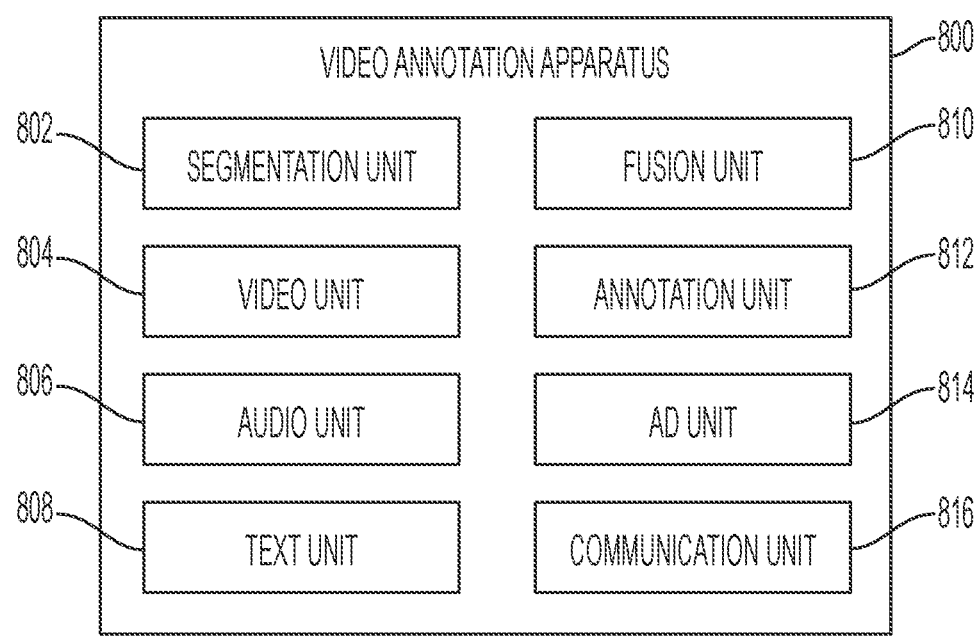
FIG. 8 illustrates an exemplary apparatus that facilitates localized contextual annotation for a video, in accordance with an embodiment of the present application.

FIG. 8 illustrates an exemplary apparatus that facilitates localized contextual annotation for a video, in accordance with an embodiment of the present application. Video annotation apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-816, which perform functions or operations similar to modules 720-734 of computer system 700 of FIG. 7, including: a segmentation unit 802; a video unit 804; an audio unit 806; a text unit 808; a fusion unit 810; an annotation unit 812; an ad unit 814; and a communication unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for localized contextual video annotation, comprising:
   segmenting a piece of video content into a plurality of segments based on a video segmentation unit;
   parsing a respective segment generated from the piece of video content;
   determining, based on the parsing, multiple input modalities for the segment, wherein a respective input modality indicates a form of content in the segment;
   classifying the segment into a set of semantic classes by applying respective classifiers on the input modalities of the segment; and
   determining an annotation corresponding to the set of semantic classes for the segment, wherein the annotation indicates semantic contextual information associated with the segment.

2. The method of claim 1, wherein classifying the segment further comprises:
   applying a corresponding classifier of the classifiers on a respective input modality for determining classification for the input modality;
   determining a unified classification for the segment based on the respective classifications for the multiple input modalities; and
   determining the annotation for the segment based on the unified classification.

3. The method of claim 2, wherein determining the unified classification further comprises fusing the respective classifications for the multiple input modalities with each other to generate the unified classification.

4. The method of claim 1, wherein the multiple input modalities include video frames separated from an audio signal of the segment; and
   wherein classifying the segment further comprises applying a deep visual classifier of the classifiers on the video frames to generate visual classification for the segment.

5. The method of claim 1, wherein the multiple input modalities include audio signal separated from video frames of the segment;
   wherein classifying the segment further comprises:
   decomposing the audio signal into a background signal and a speech signal;
   applying an audio classifier of the classifiers on the background signal to generate background audio classification for the segment; and
   applying an emotion classifier of the classifiers on the speech signal to generate emotion classification for the segment.

6. The method of claim 1, wherein the multiple input modalities include textual information separated from audio-visual signals of the segment; and
   wherein classifying the segment further comprises:
   obtaining speech text representing verbal speeches in the segment;
   aligning the textual information with the speech text; and
   applying a text-based classifier of the classifiers on the aligned text to generate textual classification for the segment.

7. The method of claim 6, further comprising obtaining a script of the movie and further aligning the script with the speech text.

8. The method of claim 1, wherein classifying the segment further comprises:
   obtaining respective feature embeddings from the classifiers for the multiple input modalities;
   combining the feature embeddings to generate a unified embedding; and
   applying a semantic classifier on the unified embedding to determine the unified classification.

9. The method of claim 8, wherein combining the feature embeddings further comprises applying feature concatenation on the feature embeddings.

10. The method of claim 1, wherein the annotation includes a set of keys indicating the semantic contextual information of the segment, wherein a respective key includes a value and a strength, wherein the value indicates a feature of the segment, and wherein the strength indicates the likelihood of the value being associated with the segment.

11. The method of claim 1, wherein the video segmentation unit is one or more of: an act, a scene, a beat, and a shot of the piece of video content.

12. The method of claim 1, wherein a respective semantic class corresponds to one of: action, danger, romance, friendship, and outdoor adventure.

13. A non-transitory computer-readable storage medium storing instructions that when executed by a computer cause the computer to perform a method for localized contextual video annotation, the method comprising:
   segmenting a piece of video content into a plurality of segments based on a video segmentation unit;
   parsing a respective segment generated from the piece of video content;
   generating, based on the parsing, multiple input modalities for the segment, wherein a respective input modality indicates a form of content in the segment;
   classifying the segment into a set of semantic classes by applying respective artificial intelligence (AI) models on the input modalities of the segment; and
   determining an annotation corresponding to the set of semantic classes for the segment, wherein the annotation indicates semantic contextual information associated with the segment.

14. The computer-readable storage medium of claim 13, wherein classifying the segment further comprises:

applying a corresponding classifier of the classifiers on a respective input modality for determining classification for the input modality;

determining a unified classification for the segment based on the respective classifications for the multiple input modalities; and determining the annotation for the segment based on the unified classification.

15. The computer-readable storage medium of claim 14, wherein determining the unified classification further comprises fusing the respective classifications for the multiple input modalities with each other to generate the unified classification.

16. The computer-readable storage medium of claim 13, wherein the multiple input modalities include video frames separated from an audio signal of the segment; and wherein classifying the segment further comprises applying a deep visual classifier of the classifiers on the video frames to generate visual classification for the segment.

17. The computer-readable storage medium of claim 13, wherein the multiple input modalities include audio signal separated from video frames of the segment;

wherein classifying the segment further comprises:
decomposing the audio signal into a background signal and a speech signal;
applying an audio classifier of the classifiers on the background signal to generate background audio classification for the segment; and
applying an emotion classifier of the classifiers on the speech signal to generate emotion classification for the segment.

18. The computer-readable storage medium of claim 13, wherein the multiple input modalities include textual information separated from audio-visual signals of the segment; and wherein classifying the segment further comprises:
obtaining speech text representing verbal speeches in the segment;
aligning the textual information with the speech text; and
applying a text-based classifier of the classifiers on the aligned text to generate textual classification for the segment.

19. The computer-readable storage medium of claim 18, wherein the method further comprises obtaining a script of the movie and further aligning the script with the speech text.

20. The computer-readable storage medium of claim 13, wherein classifying the segment further comprises:
obtaining respective feature embeddings from the classifiers for the multiple input modalities;
combining the feature embeddings to generate a unified embedding; and
applying a semantic classifier on the unified embedding to determine the unified classification.

21. The computer-readable storage medium of claim 20, wherein combining the feature embeddings further comprises applying feature concatenation on the feature embeddings.

22. The computer-readable storage medium of claim 13, wherein the annotation includes a set of keys indicating the semantic contextual information of the segment, wherein a respective key includes a value and a strength, wherein the value indicates a feature of the segment, and wherein the strength indicates the likelihood of the value being associated with the segment.

23. The computer-readable storage medium of claim 13, wherein the video segmentation unit is one or more of: an act, a scene, a beat, and a shot of the piece of video content.

24. The computer-readable storage medium of claim 13, wherein a respective semantic class corresponds to one of: action, danger, romance, friendship, and outdoor adventure.

25. A method for placing advertisement based on localized contextual video annotation, comprising:
segmenting a piece of video content into a plurality of segments based on a video segmentation unit;
parsing a respective segment generated from the piece of video content;
for determining, based on the parsing, multiple input modalities for the segment, wherein a respective input modality indicates a form of content in the segment;
classifying the segment into a set of semantic classes by applying respective artificial intelligence (AI) models on the input modalities of the segment;
determining an annotation corresponding to the set of semantic classes for the segment, wherein the annotation indicates semantic contextual information associated with the segment;
identifying an inter-segment availability (ISA) between segments of the piece of video content as a target location for placing an advertisement; and
sending annotations of a set of segments associated with the ISA to an advertisement system, wherein the set of segments includes one or more of: a preceding segment of the ISA and a subsequent segment of the ISA.

26. A method for facilitating discretionary viewing based on localized contextual video annotation, comprising:
segmenting a piece of video content into a plurality of segments based on a segmentation unit;
parsing a respective segment generated from the piece of video content;
determining, based on the parsing, multiple input modalities for the segment, wherein a respective input modality indicates a form of content in the segment;
classifying the segment into a set of semantic classes by applying respective classifiers on the input modalities of the segment;
determining an annotation corresponding to the set of semantic classes for the segment, wherein the annotation indicates semantic contextual information associated with the segment;
obtaining a viewing preference from a viewer of the video; and
determining a set of viewing segments from the plurality of segments based on the annotations for the plurality of segments, wherein the set of viewing segments complies with the viewing preference.

* * * * *